No. 849,088. PATENTED APR. 2, 1907.
W. R. SMITH.
SPRING CUSHION WORK.
APPLICATION FILED SEPT. 11, 1906.
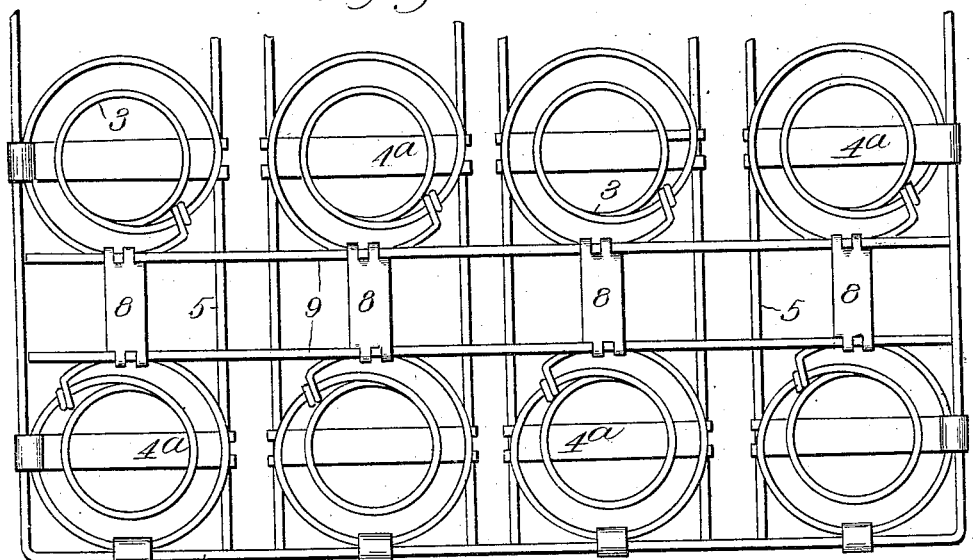
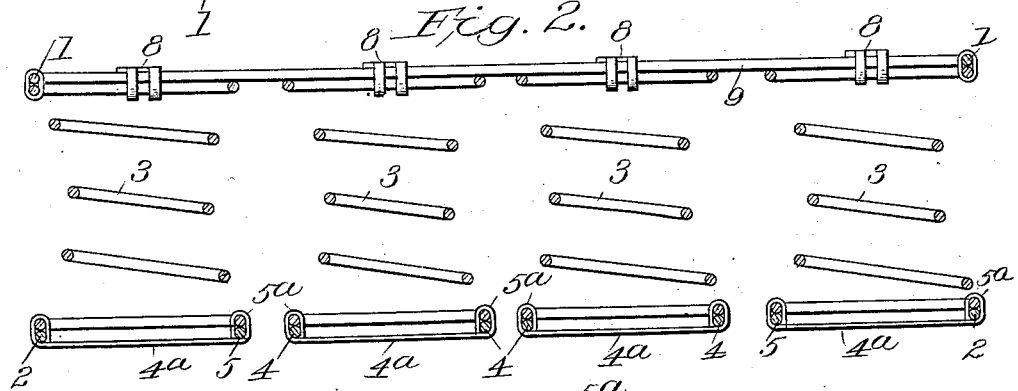
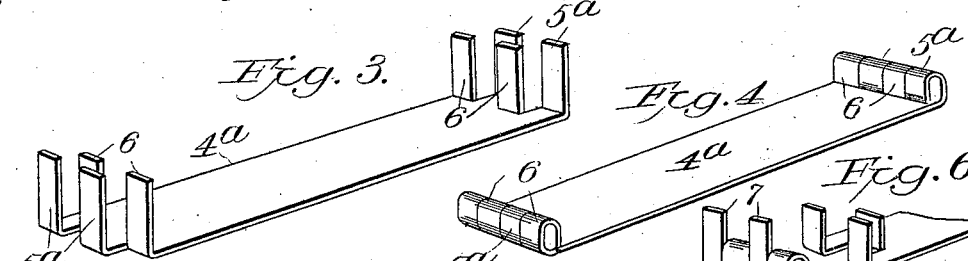
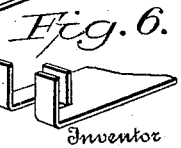
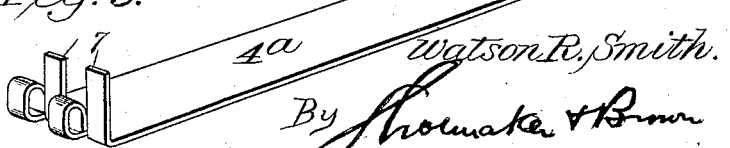
Witnesses
C. N. Walker.
A. L. Weaver.
Inventor
Watson R. Smith.
By Shoemaker & Brown
Attorneys
THE NORRIS PETERS CO., WASHINGTON, D. C.

UNITED STATES PATENT OFFICE.

WATSON R. SMITH, OF JACKSON, MICHIGAN, ASSIGNOR TO JACKSON CUSHION SPRING COMPANY, OF JACKSON, MICHIGAN.

SPRING-CUSHION WORK.

No. 849,088.  Specification of Letters Patent.  Patented April 2, 1907.

Application filed September 11, 1906. Serial No. 334,192.

*To all whom it may concern:*

Be it known that I, WATSON R. SMITH, a citizen of the United States, residing at Jackson, in the county of Jackson and State of Michigan, have invented certain new and useful Improvements in Spring-Cushion Work, of which the following is a specification.

This invention relates to spring-cushion work.

One object is to provide a spring-cushion for vehicles, chairs, couches, and other kinds of furniture and like articles.

Another object resides in the provision of a fastener embodying such characteristics as to be capable of a double-end connection with the springs or the springs and other parts of the work, each fastener being disposed, preferably, centrally of the convolutions of the respective spring to support the center coils or convolutions upon pressure being exerted upon the cushion.

A still further object is to provide a fastener constructed and arranged with respect to the springs to prevent spreading away from or the drawing close to of one spring with respect to another spring and also to form the fasteners at each end in such manner that they may be so connected to the springs and other parts of the work to form a rigid connection.

It is still further designed to provide a cushion embodying, among other characteristics, the feature of producing in the use of my improved clip a structure not having an uneven bottom likely to catch into an upholstering cover or scratch any support upon which the cushion may be disposed.

With the above and other objects in view the present invention consists in the combination and arrangement of parts hereinafter referred to, illustrated in the accompanying drawings, and particularly pointed out in the appended claims, it being understood that changes in the form, proportion, size, and minor details may be resorted to without departing from the spirit or sacrificing any of the advantages of the invention.

In the drawings, Figure 1 is a top plan view of a portion of a cushion embodying my invention. Fig. 2 is a sectional view on the line *a a* of Fig. 1. Fig. 3 is a detail view of my improved fastener prior to bending the end fingers thereof. Fig. 4 is a similar view of the fastener after bending the fingers thereof to apply or connect the springs. Fig. 5 is a detail view of a modified form of fastener. Fig. 6 is a detail view of a portion of another modified form of fastener.

Referring now more particularly to the accompanying drawings, the reference characters 1 and 2 indicate upper and lower edge wires, respectively, designed to form either a circular, partially circular, rectangular, or other form of frame for the inclosure of the springs 3.

Supporting-wires 4 are arranged in pairs within the frame, and there is one supporting-wire 5 at each side of the frame to coöperate with the corresponding side of the latter to support the outermost rows of springs upon the respective sides of the frame. It will thus be understood that the springs 3 are supported upon the supporting-wires generally, with the outermost springs of opposite sides of the frame resting partly upon the lower edge wire 2.

To support the springs firmly and to prevent them moving away from or toward one another, I employ a two-end fastener $4^a$, provided at each end with fingers. In the present instance I arrange the fingers in pairs at each end of the fastener, the outermost pairs of fingers being indicated at $5^a$ and the innermost pairs of fingers being designated by the character 6. These fingers are formed, preferably, by slitting the ends of the plate or body of the fasteners, and it will be understood that the fingers need not necessarily be arranged in pairs and that I do not limit myself as regards the number of fingers at each end of the fastener. However, in the structure shown in the accompanying drawings the outermost pair of fingers $5^a$ are adapted to be bent or coiled over the corresponding supporting-wires and the lower convolution of the corresponding spring, while the inner pair of fingers are disposed upon the side of the supporting-wire and said convolution opposite to the side upon which the outer pair of fingers are disposed and are bent or coiled opposite to the bending or coiling of the outer fingers over the corresponding supporting-wire and convolution, whereby at each end of each fastener the pairs of fingers are bent in opposite directions over the lower convolution of each spring and the corresponding supporting-wire to lock the springs firmly in position.

If preferred, I may employ the form of fastener shown in Fig. 5, wherein the inner fingers 7 are not bent or coiled, but are directed upwardly, as shown. Of course the straight or upwardly-directed inner fingers 7 are disposed upon the opposite side of the corresponding convolution and supporting-bar, as in the use of the bendable or coiled inner fingers aforesaid. In any event it is preferred to arrange the fasteners whereby one will be disposed beneath each spring and centrally thereof to prevent the intermediate or center coils being forced beneath the lowermost coil when pressure is placed upon the cushion. I may prefer to form each end of each plate of the fastener with three fingers, as shown in Fig. 6.

As indicated at 8, I may employ any one of the forms of fasteners on top of the cushion either to connect directly with the upper convolutions of the corresponding springs or to connect with the upper convolutions of the corresponding springs and the corresponding stay-wires 9. When the stay-wires are used, a rigid top is provided, and when the stay-wires are not used a more pliable top is produced.

The sides of the upper and lower convolutions of the outermost springs adjacent the upper and lower edge wires with which my fasteners do not connect may be connected in any well-known manner. The points at which these latter connections are made are indicated by the character 10.

What is claimed is—

1. A cushion comprising a frame, supporting-wires, springs disposed upon the wires, and two-end fasteners connecting opposite sides of each spring and the corresponding supporting-wires, each fastener having pairs of fingers at each end, the fingers at each end being arranged one pair in advance of the other.

2. A cushion comprising a frame, supporting-wires, springs disposed upon the supporting-wires, two-end fasteners connecting the springs and the corresponding supporting-wires, and two-end fasteners connecting the upper convolutions of each spring at opposite sides of the latter.

3. A fastener for spring-cushion work, comprising a member provided with pairs of fingers at each end, the fingers at each end being arranged one pair in advance of the other pair.

4. A fastener for spring-cushion work, comprising a member provided with pairs of fingers at each end, the fingers at each end being arranged one pair in advance of the other pair and the pairs at each end lying in different planes with respect to each other.

In testimony whereof I have signed my name to this specification in the presence of two subscribing witnesses.

WATSON R. SMITH.

Witnesses:
JOHN A. RATH,
CHARLES RUTSON.